(12) United States Patent
Fevrier et al.

(10) Patent No.: US 10,846,219 B2
(45) Date of Patent: Nov. 24, 2020

(54) DATA COPY TO NON-VOLATILE MEMORY

(71) Applicant: HEWLETT PACKARD ENTERPRISE DEVELOPMENT LP, Houston, TX (US)

(72) Inventors: Thierry Fevrier, Gold River, CA (US); David F Heinrich, Tomball, TX (US); William C Hallowell, Spring, TX (US); Mark S Fletcher, Houston, TX (US); Justin Haanbyull Park, Houston, TX (US); David W Engler, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 132 days.

(21) Appl. No.: 15/748,639

(22) PCT Filed: Jul. 31, 2015

(86) PCT No.: PCT/US2015/043242
§ 371 (c)(1),
(2) Date: Jan. 29, 2018

(87) PCT Pub. No.: WO2017/023270
PCT Pub. Date: Feb. 9, 2017

(65) Prior Publication Data
US 2018/0365147 A1  Dec. 20, 2018

(51) Int. Cl.
*G06F 11/00* (2006.01)
*G06F 12/0804* (2016.01)
(Continued)

(52) U.S. Cl.
CPC ............ *G06F 12/0804* (2013.01); *G06F 1/30* (2013.01); *G06F 1/32* (2013.01); *G06F 11/14* (2013.01);
(Continued)

(58) Field of Classification Search
CPC ............ G06F 11/2056; G06F 11/2069; G06F 11/2084; G06F 11/1446; G06F 11/1448; G06F 11/1458; G06F 11/1402
(Continued)

(56) References Cited

U.S. PATENT DOCUMENTS 4,375,663 A  3/1983 Arcara et al.
6,336,174 B1  1/2002 Li et al.
(Continued)

FOREIGN PATENT DOCUMENTS

JP   02-040725       2/1990
WO   WO-2010-013979 A1   2/2010

OTHER PUBLICATIONS

PCT/ISA/KR, International Search Report and Written Opinion, dated Apr. 20, 2016; PCT/US2015/043242; 12 pages.
(Continued)

*Primary Examiner* — Sarai E Butler
(74) *Attorney, Agent, or Firm* — Sheppard Mullin Richter & Hampton LLP

(57) ABSTRACT

A system and method for a computing device having a processor, a memory module including volatile memory for random access memory (RAM), and an integrated circuit to intercept an error signal from the processor, the intercept delaying a system shutdown of the computing device. Firmware is executed by the processor to copy contents of the volatile memory to a non-volatile memory during the delay of the system shutdown.

18 Claims, 8 Drawing Sheets

(51) Int. Cl.
*G06F 11/14* (2006.01)
*G06F 1/30* (2006.01)
*G06F 1/32* (2019.01)
*G06F 12/0868* (2016.01)
*G06F 11/20* (2006.01)

(52) U.S. Cl.
CPC ...... *G06F 11/1441* (2013.01); *G06F 11/1471* (2013.01); *G06F 12/0868* (2013.01); *G06F 11/2015* (2013.01); *G06F 2201/805* (2013.01); *G06F 2201/82* (2013.01); *G06F 2212/1032* (2013.01); *G06F 2212/205* (2013.01); *G06F 2212/214* (2013.01); *G06F 2212/311* (2013.01); *G06F 2212/313* (2013.01)

(58) Field of Classification Search
USPC .......................................................... 714/15
See application file for complete search history.

(56) References Cited

U.S. PATENT DOCUMENTS

| | | | | |
|---|---|---|---|---|
| 7,818,387 B1* | 10/2010 | King | ................... | G06F 11/0766 709/208 |
| 7,836,331 B1 | 11/2010 | Totolos | | |
| 7,840,837 B2 | 11/2010 | Totolos et al. | | |
| 8,677,182 B2 | 3/2014 | Zou | | |
| 2002/0095624 A1* | 7/2002 | Cabezas | ................ | G06F 11/221 714/43 |
| 2005/0268153 A1* | 12/2005 | Armstrong | .......... | G06F 11/0709 714/4.1 |
| 2006/0117227 A1* | 6/2006 | Hsu | ..................... | G06F 11/0712 714/44 |
| 2006/0253740 A1* | 11/2006 | Ritz | .................... | G06F 11/0769 714/38.13 |
| 2009/0179497 A1 | 7/2009 | Hoopes | | |
| 2010/0053796 A1 | 3/2010 | Boyle et al. | | |
| 2010/0174934 A1* | 7/2010 | Zhao | ..................... | G06F 1/3203 713/324 |
| 2011/0083026 A1* | 4/2011 | Mikami | ................ | G06F 1/3203 713/323 |
| 2014/0006877 A1* | 1/2014 | Zhu | ..................... | G06F 11/3466 714/45 |
| 2015/0058665 A1 | 2/2015 | Guo | | |
| 2015/0095702 A1 | 4/2015 | Woodward | | |
| 2015/0100825 A1* | 4/2015 | Jibu | ..................... | G06F 11/0706 714/23 |
| 2015/0112481 A1* | 4/2015 | Burns | ................... | B25J 9/0084 700/248 |
| 2015/0127985 A1* | 5/2015 | Onoue | .................. | G06F 3/0611 714/33 |
| 2016/0077930 A1* | 3/2016 | McKelvie | ........... | G06F 12/0246 714/19 |
| 2016/0132407 A1* | 5/2016 | Wu | ..................... | G06F 11/2025 714/4.11 |
| 2017/0286333 A1* | 10/2017 | Jayakumar | .............. | G06F 13/24 |

OTHER PUBLICATIONS

Troubleshooting Server Hardware Issues—Cisco, Oct. 4, 2013, 9 pages, www.cisco.com/c/en/us/td/docs/unified_computing/ucs/ts/guide_old_FM/TS_Server.html.

* cited by examiner

100

100

214

DATA COPY TO NON-VOLATILE MEMORY

BACKGROUND

Computing devices typically have volatile memory, such as random access memory (RAM), processor cache, and so on. In operation, the operating system of the computing device may direct a processor to store data in the volatile memory. Volatile memory generally requires power.

Computing devices may experience a catastrophic error event related to hardware, software, and/or loss of power. Such a catastrophic error or other triggering event may result in the shutdown of the computing device and the associated interruption of power to components of the computing device. The shutdown may thus result in the loss of data in volatile memory of the computing device.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
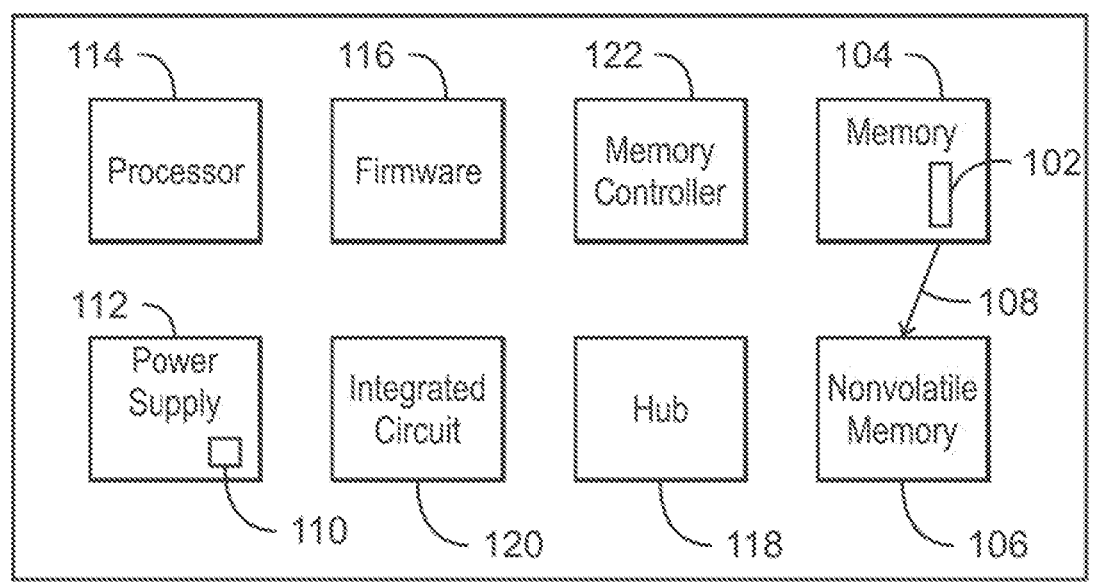
FIG. 1 is a block diagram of a computing device having a memory module with volatile memory in accordance with examples.

A computing system or device may include a number of memory modules. These memory modules may serve as system memory or "primary memory" of the system, which may store information for running programs and the like. The volatile memory on the memory modules may lose data upon the computing device experiencing a power loss, or catastrophic error including those errors causing a system shutdown. However, the computing device and/or memory modules may provide for persistence and saving of the data in the event of a catastrophic error or power loss.

Various examples may accommodate different kinds of non-volatile dual in-line memory modules or NVDIMMs. For instance, a NVDIMM may have a self-contained system for backup of data from volatile memory on the memory module to non-volatile memory on the memory module. In other words, disposed on the memory module may be the non-volatile memory that receives the data, the media controller that controls the backup, and a small or micro uninterruptible power supply (UPS) that can provide for a relatively short time of electricity if needed. For such a NVDIMM, the copying of the data from volatile memory to non-volatile memory may be implemented by the memory module without significant dependence on components external to the memory module. In contrast, persistence for a DIMM may dependent on system architecture with components external to the memory module facilitating copying of the data from the volatile memory on the DIMM to non-volatile memory external to the DIMM. For such types, the computer system architecture facilitates the backup of the volatile memory of the memory module where the backup is not self-contained on the memory module.

In examples, the present techniques include a computing system or device having one or more processors (e.g., central processing units or CPUs) and one or more memory modules e.g., dual in-line memory modules or DIMMs or other modules, having volatile memory such as for random access memory (RAM). The computing device may have a power supply unit (PSU) to convert alternating current (AC) to direct current (DC). The PSU may further optionally include, for example, an embedded UPS to provide for a relatively short amount of time of power supply in a scenario of loss of primary power to backup data from volatile memory.

Examples of the computing devices accommodate the preservation or persistence of data in the volatile memory in the event of the computing device experiencing an error such as a catastrophic error or other error, including errors that cause a partial or system shutdown of the computing device. To do so in particular examples, an integrated circuit of the computing device intercepts the error signal from the processor to delay a system shutdown of the computing device. This integrated circuit, e.g., a programmable logic device or PLD, may be operationally disposed in certain examples between the processor and the south bridge or platform controller hub (PCH) of the computing device.

During the delay, data from the volatile memory of the nodules may be backed up to non-volatile memory. In other words in some examples, firmware or other code executed by the processor (CPU) may copy contents of the volatile memory on the memory module(s) to a non-volatile memory, e.g., a hard drive external to the memory module(s). The firmware may be, for example, in system non-volatile memory such as read-only memory (ROM), and may include a basic input/output system (BIOS). The programmable circuit that intercepts the error signal from the processor to delay the shutdown may be, for example, an electronic component or integrated circuit generally, and more particularly, a field-programmable gate array (FPGA), a PLD, a complex PLD (CPLD), and so forth.

Thus, examples of the present techniques may provide for a computing device having a CPU(s), firmware, memory module(s) having non-volatile memory, and an integrated circuit to intercept an error signal when the computing device experiences an error. Such errors may be a catastrophic event, catastrophic error, CATERR or CATERROR, or in general an error resulting in or causing a system shutdown of the computing device. In response to the error, the system processor or CPU may issue an error signal to the PCH to instruct a system shutdown. However, examples include intercepting the signal by the integrated circuit, e.g., PLD, to delay the shutdown. The technique may provide for copying, via the firmware and additional code and hardware, data from the volatile memory to non-volatile memory during the delay of the shutdown. Moreover, the chipset or motherboard, the system memory controller, and so on, may generally be involved, in addition to the firmware or BIOS and the system processor or CPU, in the copying of the data from volatile memory to non-volatile memory.

To further explain, in some systems, a catastrophic error signal or CATERR signal may be fed directly from the processor or CPU into the PCH or other hub architecture. However, instead, this error signal may be first fed into the aforementioned integrated circuit (e.g., PLD, CPLD, FPGA), and then fed into the PCH. Depending on settings, the integrated circuit can choose not to propagate the error signal until some event has occurred. This event may be the completion of the backup or copying of the volatile memory on the memory module to the non-volatile memory external to the memory module. Also, once the signal is intercepted, the chipset or PCH may trigger via firmware a System Management Interrupt (SMI), for example, to make the transfer of volatile data to non-volatile memory. In other words for this example, when an error or CATERR is signaled, the SMI code stored in the firmware ROM, e.g., in the BIOS, can run in a separate context from the operating system (OS). The SMI code may trigger the transfer of volatile data to non-volatile memory. The PCH triggers an SMI which gives control to the firmware/BIOS, and firmware or BIOS which may trigger the backup transfer of the data.

After initiation by the firmware or BIOS, this transfer of data may be driven by the DMA engine inside the solid elate drive (SSD)/Non-Volatile Memory Express (NVMe) firmware. In another example, the CPU may drive the transfer of data. In examples for System Management Mode (SMM), BIOS may trigger the start of a transfer of data by initiating a write transaction on queues inside the non-volatile disk drives. Each non-volatile drive may have a DMA (Direct Memory Access) engine built in, so such a DMA may initiate memory transactions to read from the DIMMs and store to the non-volatile medium drives.

Therefore, in certain examples, the BIOS firmware may drive the backup copying. In some examples, the act of copying data from the volatile memory on the memory module to the non-volatile drives may consist of at least two basic acts. First, in certain examples, when BIOS initiates to write data from the volatile memory of the memory module or DIMM to the non-volatile drives, the BIOS may write the addresses or a range of addresses in the memory module to the mapped input/output (IO) space of the external non-volatile drives. Second, the drive firmware may recognize that addresses have been written to its space, and in response, performs a DMA to the memory module to retrieve the data in the addresses stored by the BIOS. Thus, in some examples, the BIOS Initiates the transaction, but the drives themselves may do the "work" of copying the data.

Now referring to the drawings, FIG. 1 is a computing device 100 such as a server, data server, blade server, host, client computer, personal computer (PC), laptop, portable device, or other type of computing system. The computing device 100 has at least one memory module 102 in a memory 104. The memory 104 may be, for example, random access memory (RAM). The memory module 102 includes volatile memory and may be a dual in-line memory module (DIMM), a non-volatile dual in-line memory module (NVDIMM), or other type of memory module. The volatile memory on the memory module 102 may be, for example, dynamic random access memory (DRAM), static random access memory (SRAM), or the like. The operating system of the computing device 100 may direct a processor to store data in the volatile memory. Volatile memories may include capacitors to store data, and those capacitors must have their charge replenished from time to time.

In some examples, the computing device 100 provides for persistence of the contents or data of the volatile memory on the memory module 102 by copying or backing up the contents or data from the volatile memory to non-volatile memory 106, as indicated conceptually by arrow 108. In the illustrated example, the non-volatile memory 106 is external to the memory module 102 and memory 104. The non-volatile memory 106 may be a hard drive (e.g., solid-state drive or SSD) or other non-volatile memory device. The non-volatile memory 108 may be part of the computing device 100, as depicted, or may be external to the computing device 100.

Upon a catastrophic error event, e.g., due to a system failure, data from the volatile memory on the memory module 102 may be copied to the non-volatile memory 106 for backup and persistence purposes. The data that is copied to the non-volatile memory 108 may be retrieved by another device, and/or by the computing device 100 upon reboot or power cycle of the computing device 100. In short, in such systems, the backup of data from volatile memory to non-volatile memory 106 may be performed when the computing device 100 crashes, reboots, shuts down, etc.

The computing device 100 may have a UPS 110 that accommodates a loss-of-power scenario in the copying of data from the volatile memory of the memory module 102 to the non-volatile memory 106. The UPS 110 may be a battery, capacitor(s), etc. In examples, the UPS 110 may be relatively small or a "micro" UPS which provides for a short time (e.g., 60 seconds at full load) of power supply. Further, the UPS 110 may be embedded in a power supply unit (PSU) 112, as depicted, of the computing device 100. In certain examples, the PSU 112 converts AC to DC for feed to the components of the computing device 100. The PSU 112 may receive electricity from a supply or mains external to the computing device 100. The UPS 110 may be additional component of the PSU 112 and which generally does not participate in the normal operation of the PSU 122 but can be utilized when power is loss to the PSU 112.

Additionally, the computing device 100 includes at least one processor 114 and firmware 116. The processor 114 may be a central processing unit (CPU) or other processor. The firmware 116 may include executable code on non-volatile memory such as read-only memory (ROM). The firmware 116 code may delude a BIOS executable by the processor 114. If the firmware 116 includes a BIOS, the BIOS may be a legacy BIOS, a Unified Extensible Firmware Interface (UEFI), or other type of BIOS. In examples, the firmware 116 generally or the BIOS in particular may include code executable by the processor 114 to initiate and/or drive the copying of the contents/data from the volatile memory of the memory module 102 to the non-volatile memory 106. Furthermore, the computing device 100 may include a chipset or hub 118 architecture such as a south bridge, input/output (I/O) hub, platform controller hub (PCH) 118, and/or other hub architectures. The hub 118 may be configured to interface with components including various input output (I/O) devices and firmware 116 ROM, for example.

Moreover the computing device 100 may include an electronic component or integrated circuit 120 that intercepts an error signal or shutdown signal from the processor 114. The integrated circuit 120 may be a programmable logic device (PLD), a complex programmable logic device (CPLD), and so on. Again, the integrated circuit 120 may be programmed to intercept an error signal or shutdown signal from the processor 114.

The computing device 100 may induce memory controller 122 or system memory controller, and so on. In the illustrated embodiment, the memory controller 122 is separate from the memory module 102. The memory controller 122 may facilitate control of memory in the competing device 100, including control of the memory module 102 and the memory 104. The memory controller 122 may be separate from the processor 114 or integrated with the processor 114. If integrated with the processor 114, the memory controller 122 may be labeled as an integrated memory controller (IMC), for instance. In general, the memory controller 122 may be part of a memory subsystem in the computing device 100.

Lastly, it should be noted that in some examples, the backup copying may generally be initialed or driven via electronic circuitry, i.e., hardware, which implements the functionality of the backup. The backup or copying of the data may involve software, firmware (as mentioned), or both. For example, the copying of data from volatile memory to non-volatile memory may be implemented partially or fully by system firmware 116, e.g., the BIOS, as mentioned, and/or in the chipset of the computing device 100. As another example, the backup may be implemented partially or fully in a dedicated integrated circuit such as an application-specific integrated circuit (ASIC), or in a dedicated field-programmable gate array (FPGA). In some examples, the backup may be implemented as instructions, e.g., stored on a machine-readable storage medium of the computing device 100, which, when executed by a processor 114, perform the functionality of the backup. For instance, backup may be implemented via partially or fully in an operating system of the computing device 100 that runs on the processor 114.

Figure 1A:
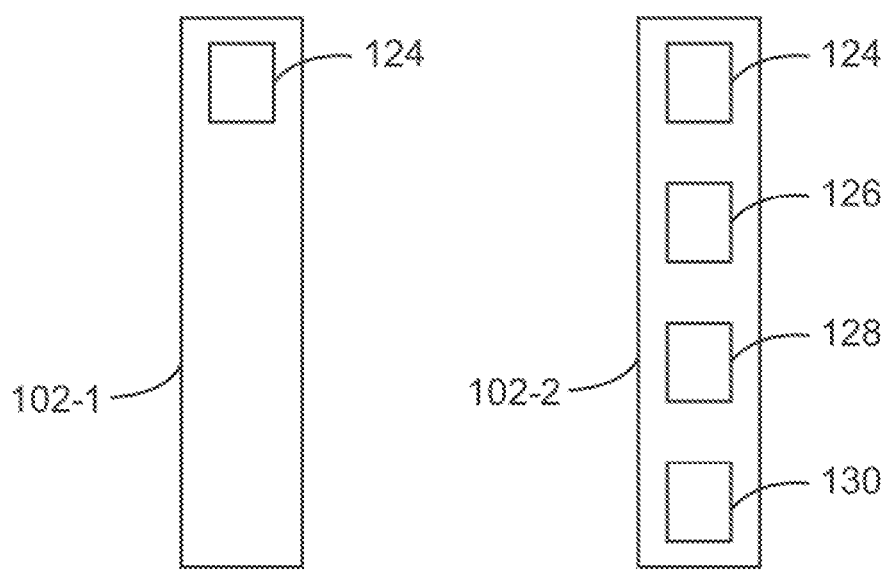
FIG. 1A is a diagram of memory modules in accordance with examples.

FIG. 1A depicts two examples 102-1 and 102-2 of the memory module 102 of FIG. 1. The memory module 102-1 has a volatile memory 124 and may be typical of a DIMM, for instance. In particular examples, the memory module 102-1 does not have non-volatile memory for persistence, i.e., to receive the back-up of the data in volatile memory 124. Likewise, while the memory module 102-1 may have simple non-volatile logic, the module 102-1 in certain instances generally does not have a memory controller or UPS for persistence, i.e., for back-up of data from the volatile memory 124. Yet, in some examples, the memory module 102-1 as a DIMM or similar module may be treated as persistence memory or a NVDIMM where the architecture of the computing device 100 imparts persistence. For example, as indicated, (1) a non-volatile memory 106 external to the module 102-1 may receive a copy of the contents in the volatile memory 124, (2) system firmware 116 or BIOS are executable by the system processor 114 may initiate or drive the copying of the volatile data to the non-volatile memory 106, and (3) a UPS 110 external from the module 102-1 may provide for power in the case of system power interruption, and so forth. Additionally, as discussed for some examples, the architecture of the computing device 100 may be configured for the integrated circuit 120 to receive error signals or shutdown signals from the processor 114. In other words, in examples, the integrated circuit 120 may act as an interface between the processor 114 and the chipset or hub 118, e.g., south bridge or platform controller hub (PCH). The integrated circuit 120, for instance, may intercept the error signal from the processor 114 in route to the hub 118, for instance.

Another example of the memory module 102 is the memory module 102-2 having volatile memory 124, and also having non-volatile memory 126, a media controller 128, and/or a small UPS 130, and so on. In particular examples, the memory module 102-2 may be a NVDIMM. The non-volatile memory 126 may be, for example, flash memory, memristor memory, and the like. The non-volatile memory 126 may provide for persistence in receiving and storing data from the volatile memory 124. The copying of data from the volatile memory 124 to the non-volatile memory 126 may be facilitated by the media controller 128. The controller 128 may be labeled a "media" controller because the controller 128 controls the transfers on the memory module 102-2 (e.g., NVDIMM) from the volatile memory 124 media (e.g. dynamic random access memory or DRAM) to the non-volatile memory 126 media (e.g., flash). The media controller 128 may consist of several functional blocks that may be contained in a single IC package or in separate packages. Thus, in some examples, the persistence operation may be self-contained on the memory module 102-2. The media controller 128 may communicate with non-volatile memory 126 (and/or the non-volatile memory 106) and with the volatile memory 124. The media controller 128 may perform operations on non-volatile memory 126 or volatile memory 124 without communicating through components external to the memory module 102-2. The media controller 128 may be also labeled as a microcontroller, backup controller, and so forth. Lastly, if the memory module 102-2 is employed in the computing device 100, the non-volatile memory 126 on the memory module 102-2 may be in addition to or in lieu of the non-volatile memory 106 external to the memory module 102-2. Likewise, the UPS 130 if present on the module 102-2 may be in addition to or in lieu of the UPS 110 external to the memory module.

Figure 1B:
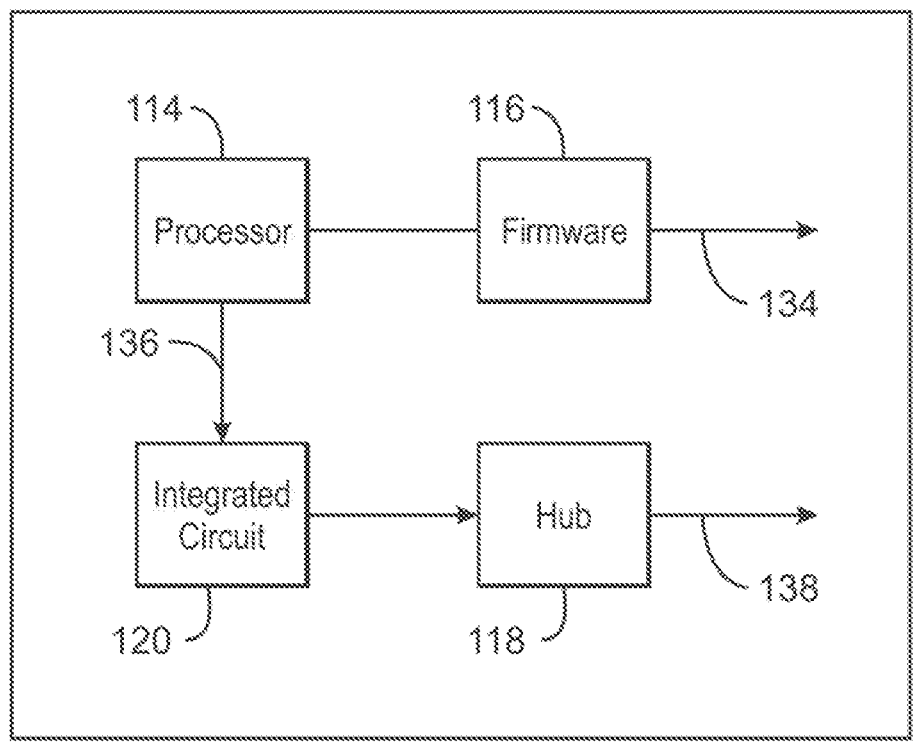
FIG. 1B is a block diagram of a computing device that copies volatile memory contents to non-volatile memory in accordance with examples.

FIG. 1B is an example of the computing device 100. Components depicted are one or more processors 114 (e.g., CPUs), the firmware 116 (e.g., in ROM), the integrated circuit 120, and the hub 118, e.g., south bridge or PCH. Of course, the computing device 100 also generally includes system memory 102 depleted in FIG. 1. In the illustrated example of FIG. 1B, the firmware 116 on non-volatile memory such as ROM and executable by the processor 114 or other processor, may initiate or direct instructions 134, for persistence, the copying of the contents or data from the volatile memory 124 (FIG. 1A) on the memory module 102 (FIG. 1) to the external non-volatile memory 106 (FIG. 1), and/or to the non-volatile memory 126 (FIG. 1A) if the module 102 has non-volatile memory 126. In some examples with the computing device 100 experiencing a catastrophic error or shutdown triggering event, the processor 114 may send an error signal 136 to the hub 118. In response, the hub 118 may send instructions 138 to components of the computing device 100 to shut down the composing device 100. However, the integrated circuit 120 may intercept the error signal 134 from the processor 114 to delay shutdown of the computing device 100, so to give time for the persistence operation of copying the contents of the volatile memory 124 of the memory module 102 to non-volatile memory 106.

In particular examples, for both the memory module 102-2, e.g., backup self-contained, and the memory module 102-1, e.g., backup via system architecture, the system integrated circuit 120, e.g., PLD, CPLD, may detect the event, e.g., error, that triggers a backup of the data from volatile memory 124 to non-volatile memory 106 or 126. For system facilitated backup, the integrated circuit 120 may generate an interrupt, such as an SMI, non-maskable interrupt (NMI), or system control interrupt" (SCI), etc., that may pull the processor(s) 114 or CPUs out of normal runtime OS operation into a BIOS controlled environment that will then execute the movement of data from the volatile (e.g., DRAM) memory 124 to the non-volatile memory 106 external to the module 102. The main processor(s) 114 or CPU(s) of the system, or any DMA engines in the system, that are moving data out of the volatile memory 124 during the backup operations may employ the system memory controllers 122. Typically, there are no media controllers on the standard DIMMs. After the backup is complete, the system or computing device 100 may then respond (as without the interrupt) to the original triggering event.

Figure 1C:
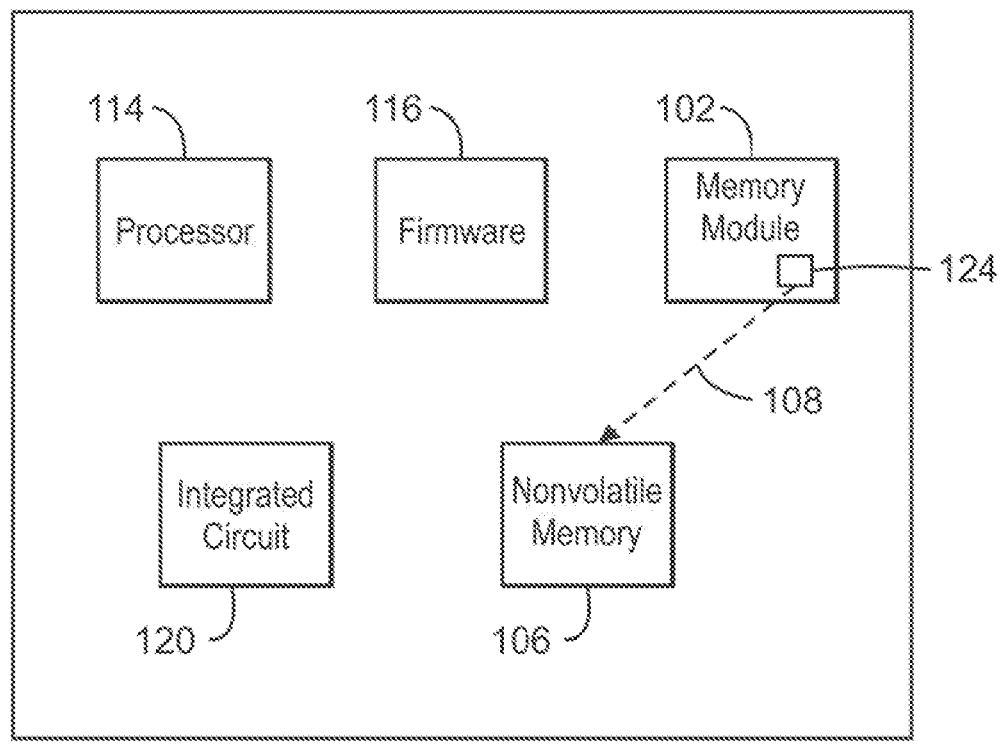
FIG. 1C is a block diagram of a computing device that copies volatile memory contents to non-volatile memory in accordance with examples.

FIG. 1C is a block diagram of a computing device that copies volatile memory contents to non-volatile memory in certain examples. The computing device 100 includes processors) 114, a memory module 102 having volatile memory for RAM, and an integrated circuit 120 to intercept an error signal from the processor 114, the intercept delaying a system shutdown of the computing device 100. The computing device includes firmware 116 executed by the processor 114 to copy contents of the volatile memory 124 to a non-volatile memory 106 external to the memory module 102 during the delay of the system shutdown, as indicated by arrow 108.

Figure 2:
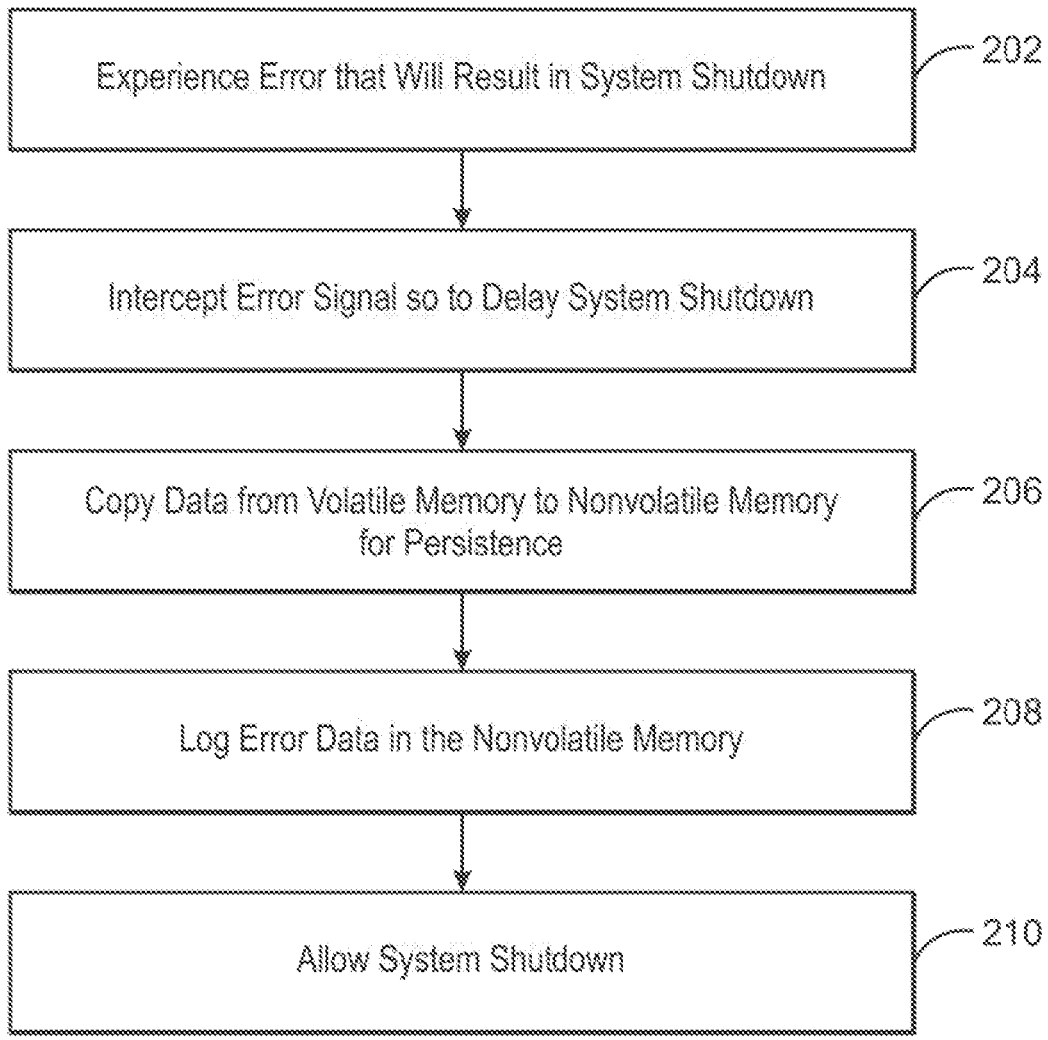
FIG. 2 is a block flow diagram of method of a computing device experiencing an error and accommodating copying of volatile memory contents to non-volatile memory in accordance with examples.

FIG. 2 is an exemplary method 200 of operating a computing device (e.g., computing device 100 of FIG. 1). At block 202, the computing device experiences an error such as a catastrophic error or CATERR. In general, the computing device experiences a triggering event that may result in shut down of the computing device 100. At block 204, a processor of the computing device issues an error signal associated with the catastrophic error or triggering event. The error signal may be intended for the chipset such as a bridge or FCH which will then instruct components in the shutdown of the computing device. However, as indicated in block 204, the error signal is intercepted by an integrated circuit, e.g., PLD or CPLD, in the computing device, so to delay the shutdown of the computing device. The delay in the shutdown may be to accommodate the copying of contents of volatile memory of the computing device to non-volatile memory for persistence, as noted in block 206.

In one example for block 206, the firmware or BIOS stored in ROM or other non-volatile memory of the computing device initiates the copying of data from volatile memory on a memory module to non-volatile memory not on the memory module. In this example, the memory module may be part of system memory or RAM. In a particular example, the memory module is a DIMM and the non-volatile memory external to the memory module is a hard drive.

At block 208, error log data may be optionally backed up to the non-volatile memory. Lastly, at the completion of block 206 including the copying of volatile data to non-volatile memory, the error signal may proceed to the PCH or other hub architecture to provide tor shutdown of the computing device, as indicated by block 210.

Figure 2A:
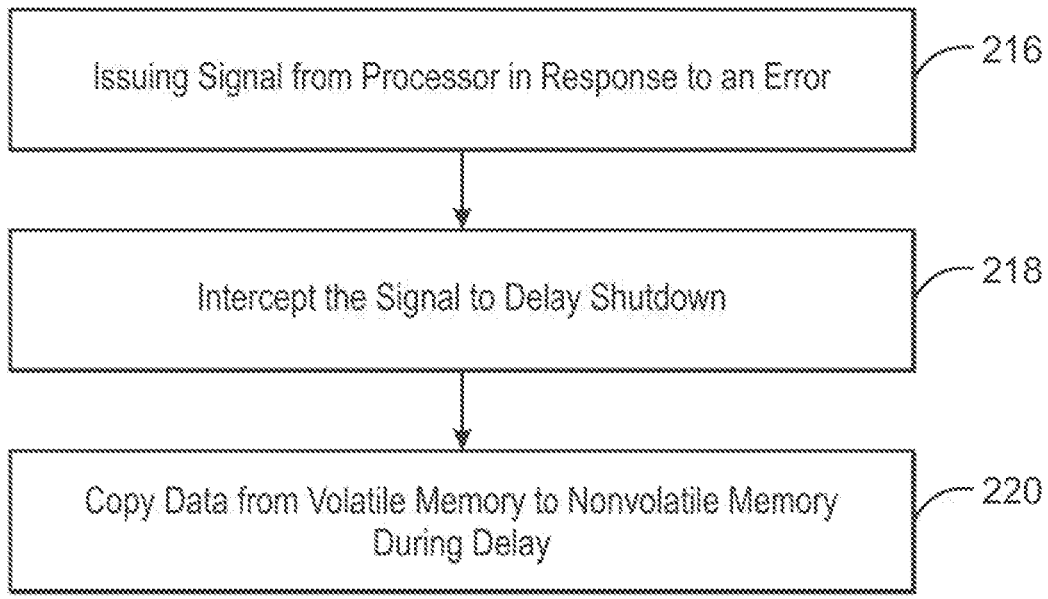
FIG. 2A is a block flow diagram of method of copying of volatile memory contents to non-volatile memory in accordance with examples.

FIG. 2A is a method 214 for a computing device of copying of volatile memory contents to non-volatile memory in certain examples. The computing device includes a processor, firmware, an integrated circuit, and a memory module having volatile memory. At block 216, the method includes issuing a signal from the processor to shut down the computing device in response to an error at the computing device. At block 218, the method includes, intercepting, by the integrated circuit, the signal to delay the shutdown. At block 220, the method includes copying, via the firmware, data from the volatile memory to non-volatile memory during the delay of the shutdown. The non-volatile memory may be external to the memory module. The non-volatile memory may be internal or external to the computing device.

As discussed, a standard memory module 102, e.g., a DIMM or module 102-1, may realize persistence implemented via system components (e.g., the processor 114 and non-volatile memory 106 external to the memory module 102, etc.). In such a configuration or similar configuration with reliance on components external to the memory module 102 for persistence of the contents of the volatile memory 124, examples of the present techniques accommodate persistence with a catastrophic (e.g., CATERROR) event initiation in the computing device 100, or with a triggering event generally that may result in shutdown of the computing device and the loss of data from the volatile memory 124 of the memory module 102.

The single fault mechanisms expand out to the system boundary instead of confined to the memory module 102 or the DIMM. The persistence may not be self-contained on the memory modules, as with other types of NVDIMMs. The system of the computing device 100 of course may be defined in part as the CPU complex, memory subsystem, IO subsystem, baseboard management controller, and so forth. The technique may generally rely on the processor 114 complex functioning adequately. Even if a system peripheral is used in a direct memory access function, the root ports, memory bus, etc. for the CPU complex generally should be functional. However, Machine Check Exceptions (MCE) and system error (SYSERR) are failures within the system boundary that may be detrimental to a backup of the volatile memory 124 on the memory module 102 being facilitated via system architecture. These errors may be typically defined as catastrophic errors (CATERROR) that might disable the processor 114 (e.g., CPU) complex. Thus, examples of the present techniques address handling of these errors. Typically, an error that will force the processor 114 complex to an S4 then S5 state, for example, may be thus redirected. The S4 and then S5 may be steps leading to a shutdown of power, e.g., a complete shutdown of power.

The phenomenon of persistent memory inside a computing device 100 or server may provide for innovation. The memory module 102-2 or certain persistent memory types may have failure mechanisms that prevent the persistence operation from occurring. These types typically have their failure mechanisms confined 10 the memory module 102-2 device. For instance, such a module 102-2 may not complete the persistence operation if the local flash memory 126 is faulty or bad, or if a volatile memory 124 (DRAM) fault local to the module 102-2 occurs, end so on. Otherwise, most external faults to the memory module 102-2 (e.g., NVDIMM) may have little or no impact on this persistence operation. For instance, a Peripheral Component Interconnect Express (PCIe) parity error may cause a computing device 100 shutdown and the persistence operation in certain examples could complete because the operation may be self-contained on the memory module 102-2.

In examples, CATERR is routed to the integrated circuit 120. When CATERR hold is detected (e.g., asserted for 16 B-clks), the integrated circuit 120 may assert a system reset into the south bridge or PCH to force a platform reset. A B-clk may be a 100 MHz clock signal sent from a clock generator part to the CPU and PCI devices. The clock generator part may be integrated inside the south bridge or PCU. In response to the reset negotiation failing, the system of the computing device 100 may go into, for example, the S4 or S5 state. In either case, integrated I/O (IIO) engines and memory subsystem may respectively stop.

The B-elks is base deck cycles and therefore, the act of waiting 16 base clock cycles is waiting a certain period of time. There may be other error conditions that are signaled by the CATERR signal if the signal is asserted for different lengths of time. Examples accommodate the "CATERR HOLD" condition which may be detected by integrated circuit 120 when the signal is asserted for 16 base clock cycles.

The IIO may be integrated with the processor 114 or CPU, and may be a subsystem within the processor 114 or CPU that is connected to PCI devices. The IIO may be a buffering and synchronization unit that accepts cycles from the PCI bus external to the processor 114 (e.g., CPU) chip and that is targeted at memory. Therefore, when a PCI device is reading or writing to a memory controller (e.g., 122) built into the processor 114, the bus cycle may be accepted into the IIO engine from the PCI bus, and then buffered and retimed to work on the internal bus of the processor 114 and sent to the memory controller 122.

These causative catastrophic errors can be expanded upon. Typically, an error that may force the processor complex to an S4 then S5 state may be redirected. Again, S4 and then S5 are steps in a complete shutdown of power. Examples of errors or events that may be redirected may be a host-partition time-out error, a 4-second power-button override, a thermal trip, and so on. Certain examples of the present techniques involve redirecting the response to these-type of errors. Instead of running to a shutdown if the redirection was to warm reset, (i.e., power remains up) the processor complex, the processor 114 may react and generate the persistence operation. Also, in some examples, the processor 114 (CPU) complex may remain alive long enough to log diagnostics which may provide debugging information for the catastrophic error or event, e.g., CATERROR.

Alternatively, a subsystem such as a PCIe device with integrated DMA engines may run the copy transactions. In some examples, the BIOS may start the subsystem. At the end or completion of the copy task, the BIOS may allow the system to transition to its natural conclusion. A particular consideration is for a 4-second override power button push or-similar override. In response to the override, the integrated circuit 120, e.g., system CPLD, may assert a reset on the alarm input and allow the execution of the backup task, and than the server would power down. Moreover, a CF9, for example, may generate a SMI. A CF9 may be an I/O port address that directs to the south bridge or PCH. The CF9 may be an I/O register built info the system chipset that is at I/O space address 0xCF9, Depending on the value written to the I/O address, the system may execute different types of resets, such as cold or warm, and if so, the BIOS may copy the data and complete the CF9 steps. Specific bits in this register when written cause the chipset hardware to reset and/or power down the system. Again, when a write to the CF9 register is detected, for example, such could cause a trap and then may generate an SMI. If so, the BIOS in the SMI may copy the data, and complete the originally intended function of the write to CF9.

In general, examples may include handing of events of system errors that generate CATERRORs. The handling may reduce the number of single fault failures for a persistent backup copying of volatile memory to non-non-volatile memory not self-contained on the memory module. Provided may be a technique of preventing or reducing silent data corruption.

Figure 3:
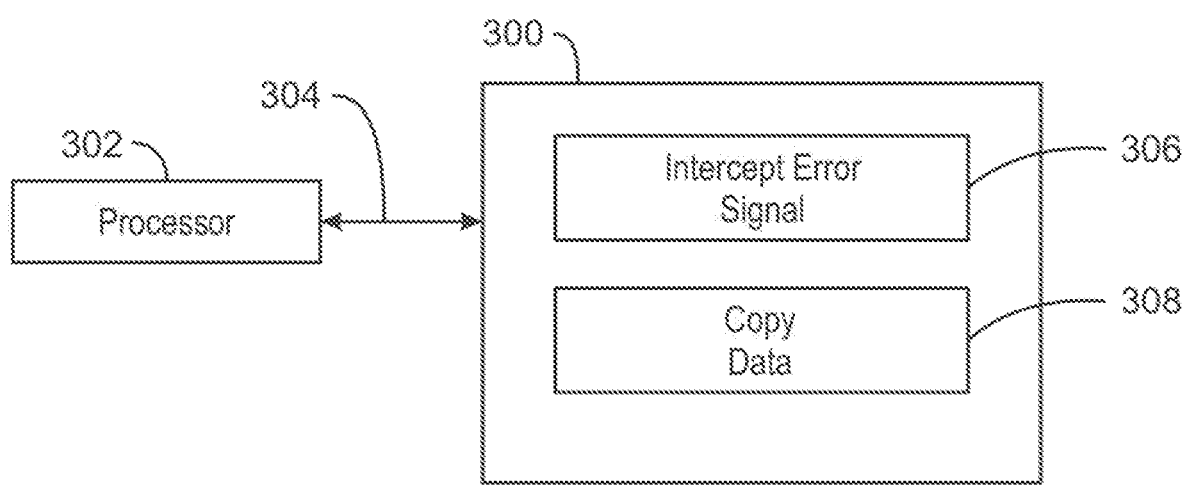
FIG. 3 is a block diagram showing a tangible, non-transitory, computer-readable medium that stores code configured to direct a computing device experiencing an error and accommodating copying of volatile memory contents to non-volatile memory in accordance with examples.

FIG. 3 is a block diagram showing a tangible, non-transitory, computer-readable medium that stores code configured to operate a data storage system. The computer-readable medium is referred to by the reference number 300. The computer-readable medium 300 can include RAM, a hard disk drive, an array of hard disk drives, an optical drive, on array of optical drives, a non-volatile memory, a flash drive, a digital versatile disk (DVD), or a compact disk (CD), among others. The computer-readable medium 300 may be accessed by a processor 302 over a computer bus 304. Furthermore, the computer-readable medium 300 may include code configured to perform the methods and techniques described herein. The computer readable medium 300 may be the memory of the computing device 100 of FIG. 1 in certain examples. The computer readable medium 300 may include firmware (e.g., part of firmware 116) that is executed by a processor of the computing device 100 of FIG. 1.

The various software components discussed herein may be stored on the computer-readable medium 300. The software components may include handling an error, and the moving and copying of data from volatile memory to non-volatile memory. A portion 306 of the computer-readable medium 300 can include a module or executable code that directs or complements an electronic component or integrated circuit (e.g., PLD or CPLD) in a computing device to intercept an error signal or shutdown signal from a processor such as the one or more processors 114 in the computing device 100. A portion 308 can include a module or executable code that directs a processor to copy contents from volatile memory of a memory module to non-volatile memory external to the memory module. Lastly, a portion 310 may include a module or executable code that logs error data to non-volatile memory. Although shown as contiguous blocks, the software components can be stored in any order or configuration. For example, if the tangible, non-transitory, computer-readable medium 300 is a hard drive, the software components can be stored in non-contiguous, or even overlapping, sectors.

Figure 4:
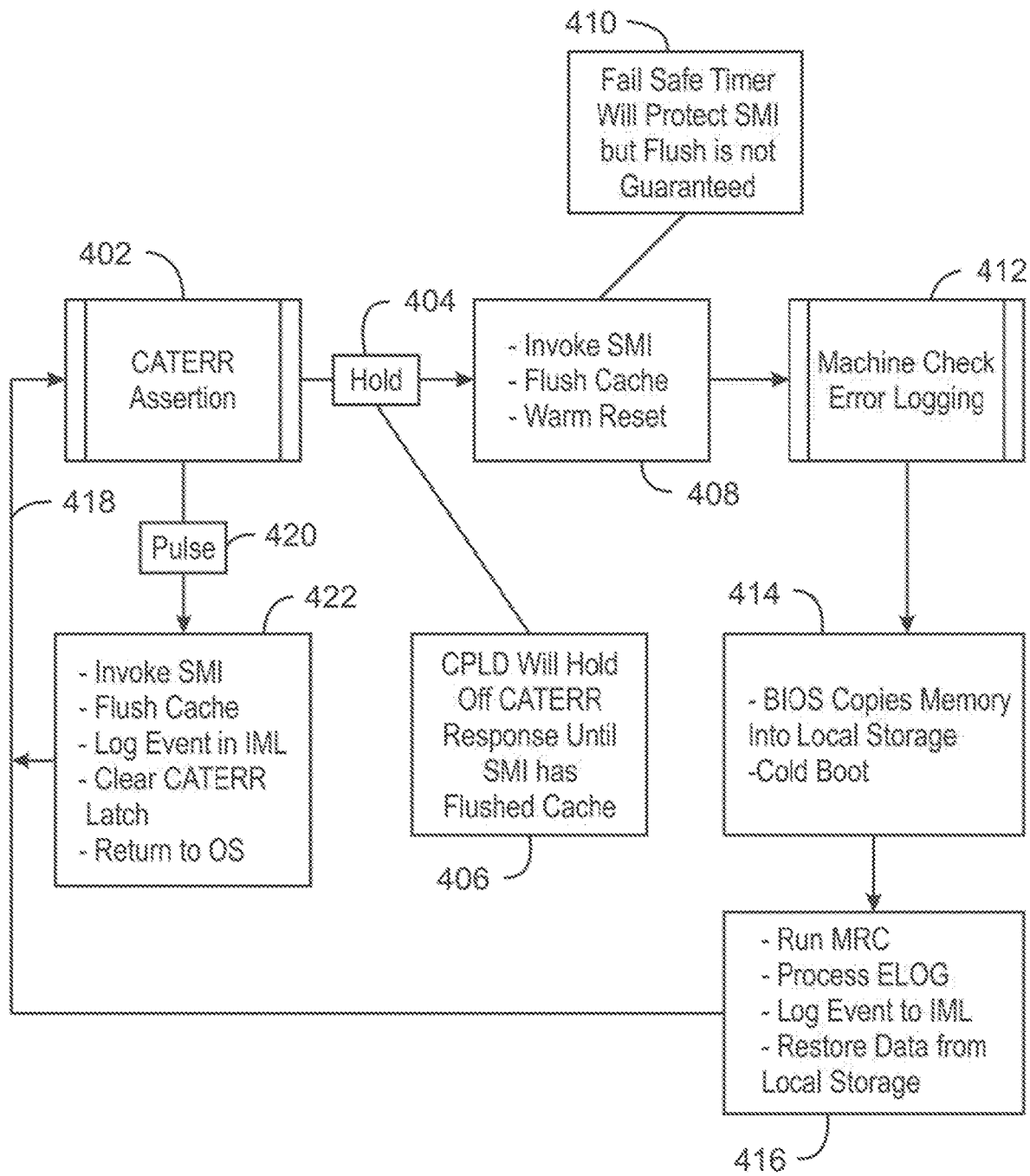
FIG. 4 is a block flow diagram of a method of a computing device experiencing an error and accommodating copying of volatile memory contents to non-volatile memory in accordance with examples.

FIG. 4 is a particular example of a method 400 of a computing device experiencing an error and accommodating copying of volatile memory contents to non-volatile memory. At block 402, a catastrophic error (e.g., CATERROR or CATERR) assertion is made, such as via a processor or CPU of the computing device. An integrated circuit (e.g., PLD or CPLD) may intercept and hold off the error response until the SMI has flushed the cache of the computing device, as indicated by blocks 404 and 406. For example, the SMI may flush processor (CPU) cache to a RAM memory module or DIMM. At block 408, the SMI is invoked and flushes the cache, and a warm reset may be performed. Without the hold 404, a failsafe timer may protect the SMI but the flush is not guaranteed, as indicated by block 410 where the catastrophic error assertion is not intercepted or held. Thus, as noted, a CPLD, for instance, may intercept and hold 404 off the error response. At block 412, Machine Check Error logging may be performed, which may be mechanism for collecting error data from MCA banks. At block 414, the firmware or BIOS copies the contents of volatile memory on the RAM memory modules to non-volatile storage such as to a hard drive or local storage external to the RAM. Then, the computing device may be subjected to a cold boot.

At block 416, the memory reference code (MRC) of similar code is run. The MRC may be part of the firmware or BIOS that determines how the system memory (RAM) will be read and written, adjusts memory timing algorithms, initializes the memory as part of the POST process at power-on, and so forth. At block 416, actions may include processing Machine Check Error logging, logging an event to a system event log such as an integrated management log (IML), and restoring data from the hard drive or local storage. The computing device may be under normal operation, as indicated by arrow 418, prior to experiencing another catastrophic error triggering event.

Lastly, a catastrophic error (CATERR) assertion may pulse 420 to give various actions including those listed in block 422: invoke SMI, flush cache, log event in IML, clear CATERR latch, and return control to the operating system. After such actions, the computing device may return to normal operation, as indicated by arrow 418, prior to experiencing another catastrophic error triggering event.

Thus, there may be two types of CATERRs. A CATERR "PULSE," may be for the CATERR signal from the system processor or CPU is asserted for 16 BLCKs or 160 nanoseconds. A CATERR "HOLD" also known as an IERR may be for when the CATERR signal from the system processor or CPU s asserted until a warm reset occurs. A "PULSE" event is one which may be potentially recoverable whereas a "HOLD" event is typically one such that the system can no longer continue normal operation and may reset.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents failing within the true spirit and scope of the appended claims.

What is claimed is:

1. A computing device comprising:
   a processor to transmit a catastrophic error signal to a hub of the computing device responsive to the computing device experiencing an error or shutdown triggering event;
   a memory module comprising volatile memory for random access memory (RAM);
   the hub to shut down the computing device upon receipt of the catastrophic error signal;
   an integrated circuit to intercept the catastrophic error signal upon transmission to the hub, the intercept delaying a system shutdown of the computing device; and
   firmware executed by the processor to, responsive to the error signal intercept, copy contents of the volatile memory to a non-volatile memory,
   wherein the integrated circuit delays the system shutdown of the computing device by a pulse where the error is recoverable or a hold where the error is non-recoverable.

2. The computing device of claim 1, comprising the non-volatile memory.

3. The computing device of claim 1, wherein the non-volatile memory is external to the memory module.

4. The computing device of claim 1, wherein the memory module comprises a dual in-line memory module (DIMM).

5. The computing device of claim 1, wherein the integrated circuit comprises a programmable logic device (PLD) or a complex programmable logic device (CPLD).

6. The computing device of claim 1, wherein the hub is a south bridge or a platform controller hub (PCH).

7. The computing device of claim 1, comprising:
   a memory controller to facilitate the copy of the contents of the volatile memory to the non-volatile memory during the delay of the system shutdown; and
   a power supply unit (PSU) to convert alternating current (AC) to direct current (DC), wherein the PSU further comprises an embedded uninterruptible power supply (UPS) to provide power for the copy of the contents of the volatile memory to the non-volatile memory during the delay of the system shutdown.

8. The computing device of claim 1, wherein the integrated circuit generates an interrupt to pull the processor out of normal runtime Operating System operation into a basic input/output system (BIOS) controlled environment copy for copying the contents of the volatile memory to a non-volatile memory.

9. A method comprising:
   responsive to a catastrophic error at a computing device, issuing a catastrophic error signal from a processor of the computing device to a hub to shutdown the computing device in response to receiving the catastrophic error, the computing device comprising a processor, firmware, an integrated circuit, and a memory module having volatile memory;
   intercepting by the integrated circuit the catastrophic error signal upon transmission to the hub; and
   responsive to intercepting the signal, copying, via the firmware, data from the volatile memory to non-volatile memory,
   wherein the integrated circuit delays the system shutdown of the computing device by a pulse where the error is recoverable or a hold where the error is non-recoverable.

10. The method of claim 9, wherein the non-volatile memory is external to the memory module.

11. The method of claim 9, wherein the copying is via the firmware and a system memory controller, and wherein the error comprises a trigger event resulting in a system shutdown of the computing device.

12. A tangible, non-transitory, computer-readable medium comprising instructions that direct a processor to:
   intercept a catastrophic error signal transmitted from a processor intended for a hub architecture of a computing device to shutdown the computing device, the intercept to delay the shutdown of the computing device; and
   responsive to the error signal intercept, copy, via firmware of the computing device, data from volatile memory of a memory module of the computing device to non-volatile memory,
   wherein the integrated circuit delays the system shutdown of the computing device by a pulse where the error is recoverable or a hold where the error is non-recoverable.

13. The computer-readable medium of claim 12, wherein the copying of data from the volatile memory to the non-volatile memory is self-contained on the memory module.

14. The computer-readable medium of claim 12, wherein the non-volatile memory is external to the memory module.

15. A memory module comprising:
   volatile memory for Random Access Memory (RAM);
   an integrated circuit to intercept a catastrophic error signal from a processor to a hub of a computing device, the hub to shut down the computing device upon receipt of the catastrophic error such that an intercept of the catastrophic error delays a system shutdown of the computing device; and firmware executed by the processor to, responsive to the error signal intercept, copy contents of the volatile memory to a non-volatile memory, wherein the integrated circuit delays the system shutdown of the computing device by a pulse where the error is recoverable or a hold where the error is non-recoverable.

16. The memory module of claim 15, further comprising the non-volatile memory.

17. The memory module of claim 15, further comprising a media controller to facilitate the copy of the contents of the volatile memory to the non-volatile memory.

18. The memory module of claim 15, further comprising an uninterruptible power supply (UPS) to provide power for the copy of the contents of the volatile memory to the non-volatile memory.

\* \* \* \* \*